United States Patent [19]

Gerson

[11] 3,846,018
[45] Nov. 5, 1974

[54] EYEGLASSES WITH SELECTIVELY TILTABLE FRAMES

[76] Inventor: Lawrence Gordon Gerson, 410 W. 24th St., New York, N.Y.

[22] Filed: June 14, 1973

[21] Appl. No.: 369,996

[52] U.S. Cl. ............... 351/120, 16/128 A, 351/153
[51] Int. Cl. ..................... G02c 5/14, G02c 5/22
[58] Field of Search ........... 351/120, 153; 16/128 A

[56] References Cited
UNITED STATES PATENTS
3,060,804   10/1962   Rogers .............................. 351/120
3,189,912   6/1965   Miller .............................. 351/120 X

*Primary Examiner*—Paul A. Sacher
*Attorney, Agent, or Firm*—Armand E. Lackenbach

[57] ABSTRACT

Eyeglasses, particularly for bifocal lenses, comprising a front frame selectively tiltable by the user relative the temple bars for changing of the optical axis and positioning of the front frame.

4 Claims, 13 Drawing Figures

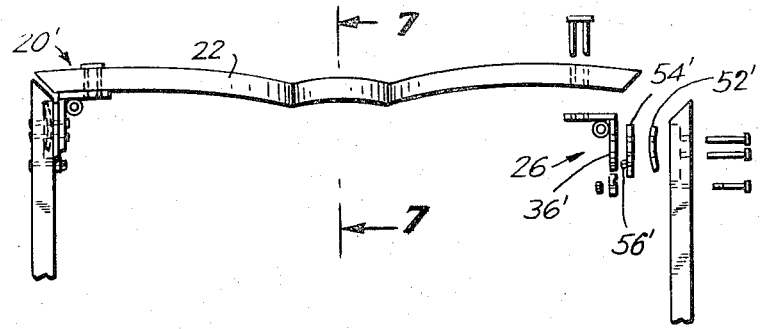
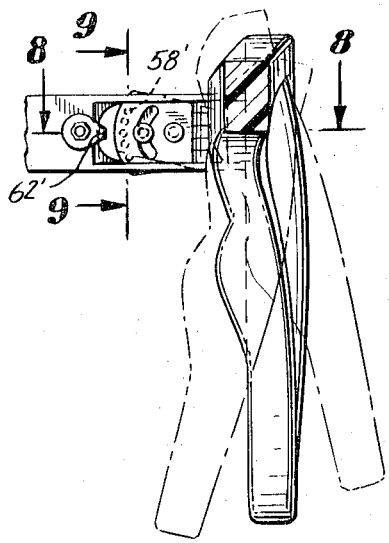
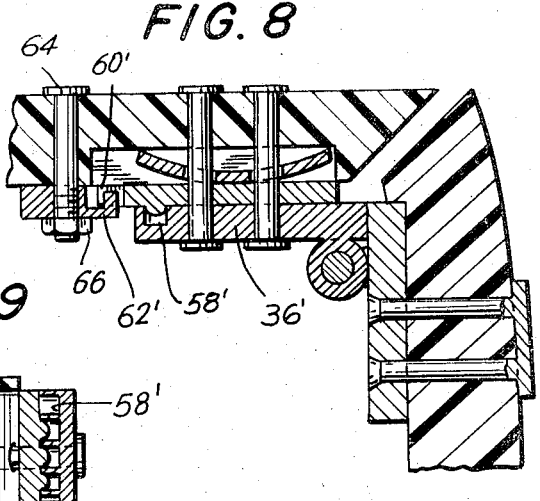
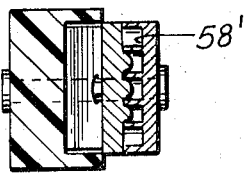
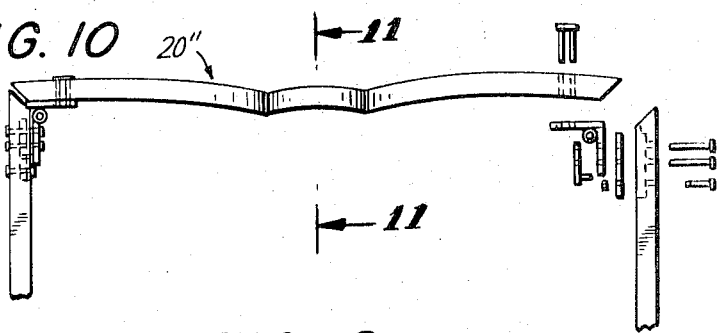
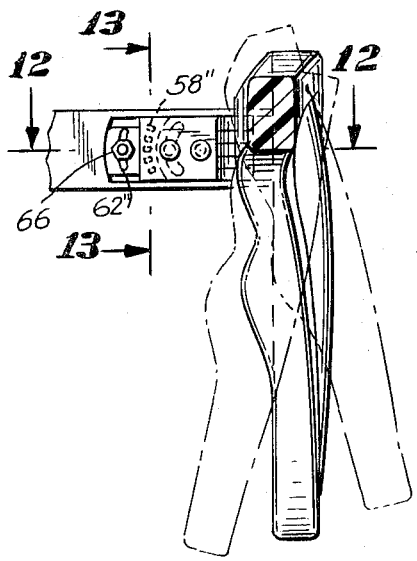
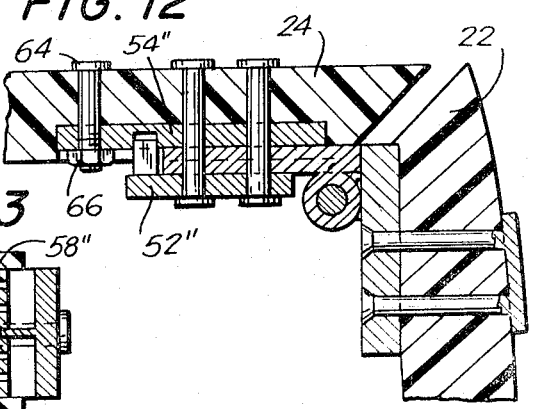
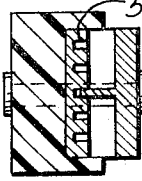

EYEGLASSES WITH SELECTIVELY TILTABLE FRAMES

This invention relates generally to eyeglasses and, more particularly, to user adjustable frames for eyeglasses.

If the front frame of a pair of eyeglasses is made tiltable relative the temple bar for selective tilting by the user or wearer of the eyeglasses, then adjustments to the orientation may be made by the user to compensate for unusual viewing conditions or viewing conditions differing from those occuring when the eyeglasses are initially fitted to that individual.

It has long been recognized that the fitting of eyeglasses to an individual is an individual process and that in fitting the eyeglasses to an individual it is important to determine and adjust the temple bars with relation to the front frame so as to achieve the proper angular orientation therebetween. Once this adjustment has been made, however, as by the professional initially fitting the eyeglasses to that individual, it has heretofore been impractical for the user to vary that adjustment to compensate for varying viewing conditions.

For example, the professional fitting eyeglasses to an individual must fit the eyeglasses for the most common viewing conditions, namely, for viewing generally straight ahead. When eyeglasses are adjusted for correct viewing in such a straight ahead view path, however, less than optimum results may be achieved when the viewer or user of the eyeglasses attempts to view objects or viewing planes in positions other than straight ahead. For example, when an individual wearing eyeglasses attempts to recline for reading, watching television, or the like, the adjustment of the eyeglasses when fixed for straight ahead viewing may be far from optimum. Further, with such low angle viewing, the lower frame rim may even interfere with the optical path.

If the lens of the eyeglasses are bifocal with lens portions of different focal lengths vertically distributed throughout the lens, a conventional arrangement positions the long distance lens above the short distance or reading length with any intermediate distance lens being positioned therebetween. With such lenses, it is necessary for the user to position books or other close materials for viewing at a low optical angle so that he may view them through the appropriate portion of the lens when the lens frame is in a fixed position relative the temple bars. Similarly, with such glasses, a user may not recline when watching television, or the like, since such activity and positioning would dispose the reading lens in his optical path, rather than the desired distance lens portion.

If the lens frame is, however, made tiltable relative the temple bars for tilting movement by the user and provided with appropriate holding means for holding the lens frame in the desired position relative to the temple bars when such movement is not desired, all of the above are disadvantages of the prior art and may be overcome or substantially reduced. Moreover, if the temple bars and the frame front are made independently adjustable or tiltable by the user, the unfolding of the eyeglasses, the temple bars may be offset from the common plane and thereby more closely folded against the frame front.

Bearing in mind the foregoing, it is therefore a primary object of the present invention to provide such user adjustable eyeglasses and eyeglass frame.

More particularly, it is another primary object of the present invention, in addition to the foregoing object, to provide a user adjustable tiltable hinge for connecting temple bar with frame fronts of eyeglasses enabling user tilting of the frame front relative the temple bars.

Another primary object of the present invention, in addition to each of the foregoing objects, is the provision of eyeglass frames utilizing such novel user adjustable hinge means.

Another primary object of the present invention, in addition to each of the foregoing objects, is the provision of such user adjustable tiltable hinge means providing positive adjustment of the maximum tilting permitted.

Another primary object of the present invention, in addition to each of the foregoing objects, is the provision of such user adjustable tiltable hinge means providing a plurality of positive adjustment positions.

Yet still another primary object of the present invention, in addition to each of the foregoing objects, is the provision of such tiltable hinge means providing a plurality of positively defined position together with means for adjusting one of such positively defined positions for optimum viewing.

Yet another and still primary object of the present invention, in addition to each of the foregoing objects, is the provision of the novel hinge means enabling enhanced compactness of folding of eyeglass frames.

The invention resides in the combination, construction, arrangment and disposition of the various component parts and elements incorporated in improved eyeglasses and eyeglass frames constructed in accordance with the principals of this invention. The present invention will be better understood and objects and important features other than those specifically enumerated above will become apparent when consideration is given to the following details and description, which when taken in conjunction with the next drawing, describes, discloses, illustrates and shows a preferred embodiment or modification of the present invention and what is presently considered and believed to be the best mode of practice in the principals thereof. Other embodiments or modifications may be suggested to those having the benefits of the teachings herein, and such other embodiments or modifications are intended to be reserved especially as they fall within the scope and spirit of the subjoined claims.

IN THE DRAWINGS

FIG. 6 is a top plan view partially exploded, similar to FIG. 1 of another embodiment of modification of the eyeglasses and eyeglass frames in accordance with the present invention;

FIG. 7 is an enlarged elevational cross-sectional view taken along line 7—7 of FIG. 6;

FIG. 8 is an enlarged cross-sectional plan partial view taken along line 8—8 of FIG. 7;

FIG. 9 is an enlarged elevational cross-sectional view taken along line 9—9 of FIG. 8;

FIG. 10 is a view similar to FIGS. 1 and 6 showing another embodiment and modification of eyeglasses, eyeglass frames and the like, constructed in accordance with the present invention;

FIG. 11 is an enlarged cross-sectional elevational view taken along line 11—11 of FIG. 10;

FIG. 12 is an enlarged cross-sectional planned view taken along line 12—12 of FIG. 11;

FIG. 13 is an enlarged cross-sectional elevational view taken line 13—13 of FIG. 11.

Figure 1:
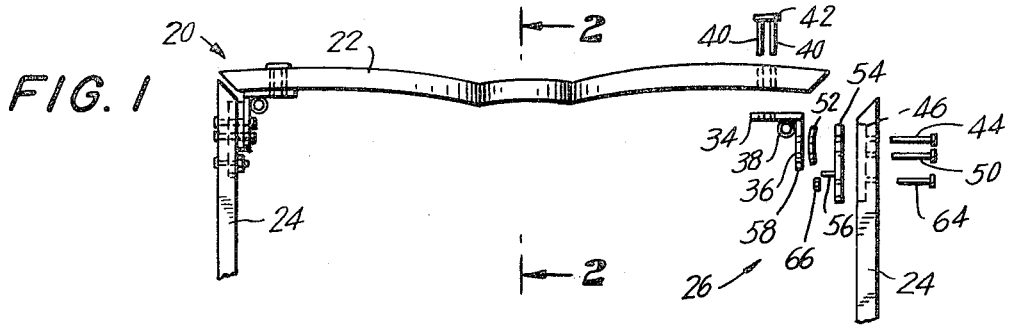
FIG. 1 is a top plan view, partially exploded, showing novel improved eyeglass frame and hinge means therefore in accordance with the present invention.

With reference now to the drawing and particularly to FIGS. 1-5, there is shown and illustrated eyeglasses comprising eyeglass frames and hinge means therefore constructed in accordance with the present invention and designated generally by the reference character 20. The eyeglass frames 20 comprise a frame front 22 to which there are attached a pair of temple bars 24 by means of hinge means 26 so that the temple bars 24 extend generally perpendicular the frame front 22 at opposite ends thereof when the eyeglass frames are open to a position for use. The eyeglass frame front 22 is designed to retain and support a pair of lens members 28 which may, in accordance with the present invention, comprise bofocal lens members having a pair of portions 30 and 32 of different focal lengths. While the present invention is particularly shown and illustrated as applied to a bifocal lens 28, it is to be expressly understood that the present invention is not limited in its utility to bifocal lens but may be utilized with conventional lenses having only a single focus, to trifocal lenses and, in general, to eyeglass lenses of substantially any design.

Further, it is to be expressly understood that there are specifically described and illustrated several embodiments or modifications of eyeglass frames and eyeglasses and throughout the several figures of the drawings, like reference characters are utilized for like components, parts and similar parts have been designated by similar reference characters, being however, respectively primed and double primed. Further, it is to be expressly understood that the various components, parts and elements shown and illustrated in the various figures of the drawing may, in general, be interchanged and combined for use in any of the various embodiments and modifications shown.

Referring now again to FIGS. 1-4, each of the hinge means 26 may comprise a first hinge leaf 34 and a second hinge leaf 36 hingedly connected together by means, for example, such as a hinge pin 38 defining a hinge axis generally centrally thereof. The first hinge leaf 34 of each of the hinge means 26 may be fixedly positioned relative the associated end portion of the frame front 22 as by means of a plurality of fastening devices 40 which may, in accordance with the present invention, comprise rivits, screws or the like, and which may be combined with a common decorative bar or facing 42 as shown. Preferably, a plurality of pins 40 are provided in generally spaced apart parallel relationship so as to fixedly position the first hinge leaf 34 with the frame front 22 and to prevent or preclude rotation therebetween. It is to be expressly understood, however, that in accordance with the present invention, the first hinge leaf 34 is fixedly positioned with the frame front 22 in use and may be so fixedly positioned either by provisional plurality of such pins 40, by adhesive bonding, by insertion within a recess, or may even be adjustable relative thereto as during initial fitting of the eyeglasses to a specific patient, as shown, for example in Miller, U.S. Pat. No. 3,189,912.

Each of the hinge means 26 is structurally associated with one of the temple bars 24 as by means of the second of the hinge leaves thereof, being movably mounted with the respective one of the temple bars 24. Such movable mounting may be accomplished by means of a pin 44 extending generally perpendicularly through the respective one of the temple bars 24 and the second one of said hinge leaves 36 so as to define a pivotal axis generally perpendicular the longitudinal axis of the temple bar 24. The second of the hinge leaves 36 may be disposed on the interior surface of the temple bar 24 or may, as shown, by disposed within a recess 46 provided extending into the temple bar 24.

The second one of the hinge leaves 36 may be further provided with an arcuate slot 48 extending generally equiradially about the pivot pin 44 and there may be provided a stop pin 50 extending through the temple bar 24 and the arcuate slot 48 which, in combination with the end portions of the arcuate slot 48 restricts movement of the hinge 26 relative the temple bar 24. As shown, the pins 44 and 50 may be peened over on the interior ends thereof so as to define rivits extending to the temple bar 24 and second one of the hinge leaves 36 or the pins 44 and 50 may comprise screws or the like, having nuts or the like, disposed at one end portion thereof.

Generally between the temple bar 24 and the associated one of the second one of the hinge leaves 36 there may be provided a bowed or beveled leave spring member 52 to provide sectional holding of the temple bar 24 and second one of the hinge leaves 36 against inadvertent movement therebetween. For yet further and more positive holding against an advertent or unintentional pivotal movement, there may be provided resilient holding means for a swing plate 54 having holding means 56 extending generally perpendicular outwardly thereof adapted to engage the second of said hinge leaves 36, as by engaging a serated edge 58 thereof so that, once anually positioned in the desired tilt configuration, the frame front 22 will remain fixedly positioned relative the temple bar 24 until positively positioned to another position relative thereto.

As heretofore pointed out, it is desirable that the optician or other professional initially fitting the eyeglasses to a user or patient, be able to provide an initial adjustment of the frame front 22 relative the temple bars 24 to positively define a preferred or normal viewing relationship at a specified angle relative the patient's eyes. To enable such initial adjustment and to define such a normal viewing position that the patient or user can return to at any desired time, the serated edge 58 may be provided with a relatively deep depression 60 so that when the holding means for pawl 56 is engaged within the depression 60 such normal viewing orientation will be defined thereby. Then, with the pawl 56 engaged within the depression 60 the optician or professional initially fitting the eyeglasses 22 to the patient or user may make the necessary adjustments in his usual manner, as by bending of the temple bars 24. In order to enable such adjustments to be made more readily, however, and to afford the necessity for bending of the temple bars 24 there may be further provided in the holding means 54 an auxillary arcuate slot 62 extending about the pivot pin 44 and means, such as an auxillary fitted pin or screw 64 and cooperating nut 66 may be provided extending through the auxillary slot 62 enabling the holding means 54 to be adjusted relative the temple bar 24 upon initial fitting of the eyeglasses 20 and then tightened against further movement by the tightening of the screw 64 and nut 66.

Figure 2:
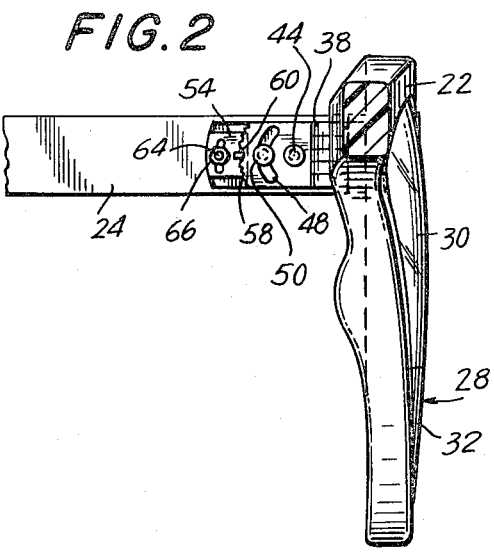
FIG. 2 is an enlarged elevational cross-sectional illustration taken along line 2—2 of FIG. 1.
Figure 3:
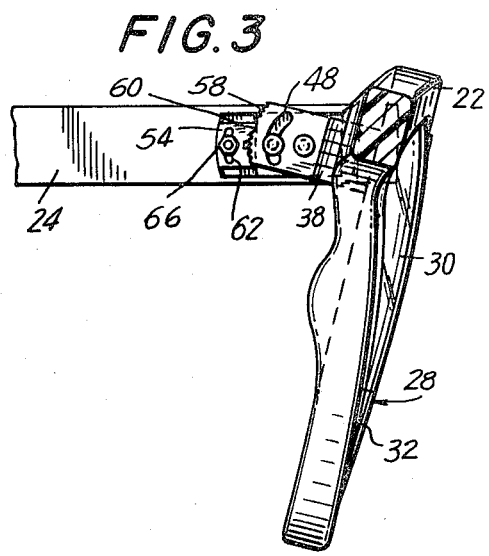
FIG. 3 is a view similar to FIG. 2 showing the frame front tilted relative the temple bars in a first direction from the intermediate position shown in FIG. 2.
Figure 4:
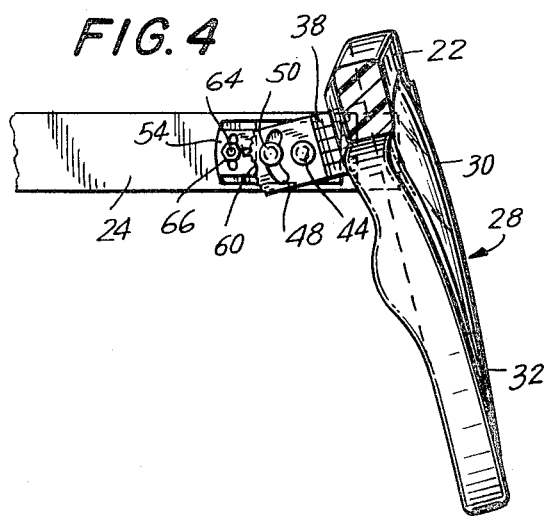
FIG. 4 is a view similar to FIG. 3 showing the frame front tilted in an opposite direction.
Figure 5:
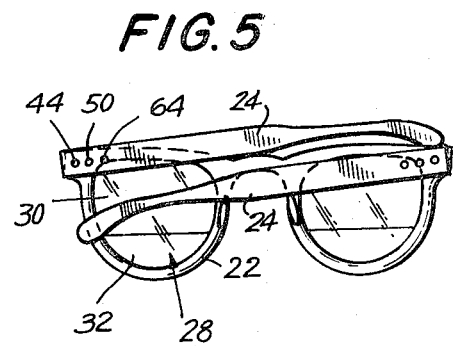
FIG. 5 is an elevational illustration of eyeglasses constructed in accordance with the present invention with the temple bars in a compactly folded position thereof.

Even after such initial adjustment has been made, the frame front 22 may be tilted by the user from such preset or normal position such as that shown in FIG. 2 either downwardly or upwardly as shown in FIGS. 3 and 4 and subsequently returned by the user to the normal position as shown in FIG. 2. Moreover, as shown in FIG. 5 the temple bars 24 may be independently swiveled or tilted relative the hinges so that the temple bars 24 may be folded substantially flat against the frame front 22 as shown in FIG. 5.

With reference now to FIGS. 6 through 9, inclusive, there is shown and illustrated another pair of eyeglasses constructed in accordance with the principals of the present invention and designated generally by the reference character 25. In the following discussion, as well as in the discussion of the embodiment or modification shown and illustrated in FIGS. 10 through 13, inclusive, like reference characters will be utilized for the various components parts and elements as in the previously described embodiment or modification but which parts which are similar but not identical will be identified in the embodiment or modification of FIGS. 6 through 9 will be primed while in connection with the embodiment or modification of FIGS. 10 through 13 will be doubled primed.

Accordingly, in the embodiment or modification of FIGS. 6 through 9 the hinge assembly 26' are similar except that the leaf spring 52' is disposed on the outside of the holding means 54' so as to bias 54' towards the hinge leaf 36'. Moreover, the pawl 56' of the holding means 54' may comprise one or more generally rounded dimples as cleared shown in FIGS. 8 and 9 which engage with one or more depressions or holes 58' in the hinge leaf 36'. A slot 60' may be provided in the outside edge and a hook like member 62' may be provided engaging within the slot 68' for defining the normal position with the hook member 62' being locked in position by a screw 64 and nut 66 as shown.

With reference now to FIGS. 10 through 13 there is shown and illustrated yet another pair of eyeglasses constructed in accordance with the principals of the present invention and designated generally by the reference character 20" wherein a leaf spring member 52" carries a pawl member for engagement within a plurality of slots or serations 58" provided on the surface of holding means 54". The holding means 54" may be adjusted or positioned to define the normal position of the frame front 22 relative the temple bars 24 and by means of a screw 64 and nut 66 and arcuate slot 62" provided in the holding means 54".

In operation, the embodiments or modifications shown in FIGS. 6 through 9 and 10 through 13, respectively, operate similarly to that shown and illustrated in FIGS. 1 through 5.

While the invention has been described, disclosed, illustrated and shown in terms of an embodiment or modification which has assumed in practice, the scope of the invention should not be deemed to be limited by the precise embodiments or modifications herein described, disclosed, illustrated or shown, such other embodiments or modifications as maybe suggested as those having the benefits of the teachings herein being intended to be reserved especially as they fall within the scope and breadth of the claims here appended.

What is claimed is:

1. Eyeglasses comprising, in combination, a frame front, a pair of temple bars and a pair of user adjustable hinge units for hingedly connecting said temple bars with the opposite ends of said frame front, to enable tilting movement of said frame front relative said temple bars and for enabling folding of said temple bars against said frame front, each of said user adjustable hinge units comprising, in turn, a first and second hinge leaf, means joining said hinge leaves of each said pair for pivotal movement about a hinge axis, means for fixedly securing each of said first hinge leaves with opposite end portions of said frame front with said hinge axes generally parallel to one another and perpendicular to the longitudinal axis of said frame front, means for movably securing each of said second hinge leaves with an end portion of one of said temple bars with said hinge axes generally perpendicular to the longitudinal axis of said temple bar and enabling pivotal movement thereof about a pivotal axis generally perpendicular to the axes of said temple bar and resilient holding means operative between each of said second of said hinge leaves and the respective one of said temple bars for self-supportingly holding said second of said hinge leaves against inadvertant or unintentional pivotal movement about said pivotal axis while enabling user adjustement of the angular orientation of said frame front relative to said temple bars so that such user may adjust such frame front for viewing through different lens portions, to maintain said frame front generally parallel to a viewed plane, for reducing distortion for tilting the lower rim of said frame front from the optical path, for enabling the temple bars to lie adjacent the frame front when folded, wherein said pivotal means comprises a pin member extending through aligned apertures extending through said temple bar and said other of said hinge leaves together with means to positively define at least two angular positions of said frame front relative said temple bars, wherein said defining means comprises a pin-like projection extending generally perpendicular to each of said temple bars in generally parallel relationship and a generally arcuate slot in each of said second of said hinge leaves about said pin-members, said pin-like projection extending into said slot to limit the pivotal movement about said pin-member, and wherein said resilient holding means comprises bowed leaf spring acting between each of said second of said hinge leaves and the associated one of said temple bars.

2. Eyeglasses defined in claim 1 wherein said holding means further comprises multiple position detent means operatively and structurally associated between each of said second of said hinge leaves and the associated one of said temple bars.

3. Eyeglasses defined in claim 2 wherein one position of said detent means comprises a neutral position corresponding to a normal angular orientation for the user.

4. Eyeglasses defined in claim 3 further comprising means for enabling adjustment of said neutral position.

* * * * *